United States Patent Office 3,201,195
Patented Aug. 17, 1965

3,201,195
PROCESS OF MAKING SUBSTANTIALLY PURE ALKALI METAL AND AMMONIUM PHOSPHATES FROM CRUDE PHOSPHORIC ACID
Hans Huber, Volkerstrasse 16, Wiesbaden-Biebrich, Germany, and Helmut Keller, Emserstrasse 1, Wiesbaden, Germany
No Drawing. Filed Jan. 14, 1960, Ser. No. 2,341
Claims priority, application Germany, Jan. 17, 1959, C 18,223; Jan. 24, 1959, C 18,275; Nov. 10, 1959, H 37,841
7 Claims. (Cl. 23—107)

The present invention relates to a process of making substantially pure alkali metal and ammonium phosphates from crude phosphoric acid obtained by the wet process.

Phosphoric acid is produced, for instance, according to the wet process by decomposing natural phosphate rocks and technical phosphates and especially calcium phosphates with sulfuric acid and filtering off the precipitated calcium sulfate. The resulting crude phosphoric acid solutions contain impurities such as iron, aluminum, calcium, magnesium, and other metals in the form of their phosphates, hydrofluoric acid, fluosilicic acid, sufluric acid, and other acids and organic impurities. The organic impurities are usually destroyed by the action of chlorine. The resulting crude phosphoric acid is then neutralized by means of alkalies or ammonia.

When completely or partly neutralizing such a crude phosphoric acid under atmospheric pressure at elevated temperature but not exceeding boiling temperature, the impurities are precipitated only incompletely and in a form in which they cannot readily be separated from the phosphate solution. In order to obtain technically pure alkali metal or ammonium phosphates, these precipitates have to be separated from the phosphate solution by filtration, an operation which, as is known, meets with great difficulties. The precipitates consist of very small particles of a particle size below $4\mu$. Said particles are usually of amorphous nature and contain a large amount of water. After filtration and washing, the resulting neutralization slurries contain more than 70% of moisture, i.e. more than 9 parts of water per 4 parts of dry substance (dried at 110° C.). For this reason large amounts of wash water must be used in order to completely remove the adsorbed phosphate solution.

It is one object of the present invention to provide a simple and effective process of producing substantially pure alkali metal and ammonium phosphates by neutralizing crude phosphoric acid obtained by the wet process, which new process serves to overcome the disadvantages encountered heretofore.

Still another object of the present invention is to provide a process of removing the impurities, precipitated heretofore in an amorphous state on neutralizing crude phosphoric acid, by converting them into crystalline and readily filtrable form.

These and other objects of the present invention and advantageous features thereof will become apparent as the description proceeds.

In principle, the process according to the present invention consists in neutralizing crude phosphoric acid obtained by the wet process with alkali metal hydroxides or carbonates or with ammonia under pressure at a temperature exceeding boiling temperature at atmospheric pressure.

Crude phosphoric acid as it is obtained in the wet process has ordinarily a phosphorous pentoxide content between about 300 g. and about 400 g. per liter. Such an acid is heated according to the present invention under pressure to a temperature exceeding about 110° C. but not higher than about 300° C., preferably to a temperature between about 120° C. and about 200° C. before or during neutralization, i.e. to a temperature exceeding the boiling temperature of the crude starting phosphoric acid at atmospheric pressure. Neutralization may be effected in such a manner that the superacid phosphates of the formula $MeH_2PO_4 \cdot H_3PO_4$ are obtained. In this formula Me indicates an alkali metal or ammonium. The pH-value of the phosphoric acid may also be adjusted to a pH yielding the dialkali metal or the diammonium phosphates. Preferably, neutralization is carried out to the pH-value of the mono-alkali metal or mono-ammonium orthophosphates. When proceeding in this manner, the impurities are precipitated in the form of a coarsely dispersed and readily filtrable slurry and considerably more completely than heretofore possible in the low temperature neutralization and precipitation process. The higher the temperature is on heating under pressure, the more quantitative precipitation is achieved and the less water the precipitates contain. The precipitated impurities settle with a satisfactory speed and can be separated from the phosphate solution simply by decanting. Heretofore this was not possible. Washing of the precipitate is also readily effected. The coarsely dispersed state of the slurry obtained according to the present invention permits the use of other more effective filtering devices, such as thickening apparatus, vacuum drum type filters, centrifuges, and the like, which could not be employed heretofore. The slurries obtained according to the present invention have particles of a size exceeding $4\mu$. With increasing temperature crystalline agglomerates of a particle size up to $40$–$50\mu$ are obtained. The moisture content of the slurry obtained at a temperature of 200–250° C. is less than 20% as compared with a moisture content of about 60% of a product neutralized at about 120° C. when filtered and washed in the usual manner. This means that the slurries obtained at said high temperature contain less than 1 part of water per 4 parts of solid substance which is only about one tenth part of the moisture content present in the slurries heretofore obtained. The amount of phosphate salt which is removed with the wash water as well as the amount of wash water itself are decreased in about the same proportion.

The benefits of the process according to the present invention are especially apparent when neutralizing the crude phosphoric acid to a pH-value between the pH-value of the super-acid alkali metal or ammonium phosphate of the formula $MeH_2PO_4 \cdot H_3PO_4$ and the pH-value of the monoalkali metal or mono-ammonium phosphate of the formula $MeH_2PO_4$, i.e. between a pH-value of about 2.0 and a pH-value of about 3.5, and especially between a pH-value of about 2.0 and about 2.5. The pH-values given herein and in the claims are determined in the undiluted solutions; for, on dilution, the pH-values change considerably.

Crude phosphoric acid, when neutralized under atmospheric pressure at a temperature below boiling temperature to a pH of about 2.0 does not yield precipitates of the impurities immediately on neutralization. Colloidal and almost unfiltrable precipitates of metal phosphates are formed only gradually and incompletely in the super-acid alkali metal or ammonium phosphate solutions. However, when heating the phosphate solution under pressure to elevated temperatures according to the present invention, the phosphates of iron, aluminum, titanium, vanadium, and other metals are almost completely precipitated within a few hours. Precipitation according to the present invention is considerably accelerated on increasing the pH-value of the phosphate solution step by step by further neutralization and on heating the phosphate solution to elevated temperature under pressure with the addition of the metal phosphate slurries obtained in a preceding operation. On increasing the pH-value to a pH of about 2.5 and heating to a temperature between 200° C. and 250° C. in the presence of a metal phosphate slurry obtained in a preceding operation, the metal phosphates are precipitated almost quantitatively within one hour. Thus, when neutralizing large quantities of crude phosphoric acid, such as volumes of 10 cu. m. to 30 cu. m., the time required for completing neutralization at elevated temperature under pressure is fully sufficient to almost completely precipitate the impurities even at a relatively low pH-value. If neutralization takes more than one hour, precipitation of the metal phosphates of a previous batch is completed even when heating only to 150° C. to 200° C. Said metal phosphates are precipitated in the same form and almost completely under the conditions according to the present invention, if the pH-value is increased to a pH higher than about 2.5. At pH-values higher than about 2.5 the phosphates of calcium, magnesium, manganese, and the like are also precipitated. Such phosphates could not be precipitated at all at the pH-values between 2.5 and 3.5 under the conditions heretofore used. Heretofore precipitation of said metal phosphates set in only at the pH-value of the mono-alkali metal or mono-ammonium orthophosphate stage and was incomplete even then.

The lowest pH-value at which metal phosphates with the exception of the calcium and magnesium phosphates are precipitated depends also on other factors, such as the content of calcium and magnesium oxides in the crude phosphoric acid. If the content of calcium and magnesium oxide is lower than 2 g./l., precipitation of calcium and magnesium phosphates according to the present invention sets in only at a pH-value of about 2.5.

Depending upon the content of hydrofluoric acid and of fluosilicic acid in the crude phosphoric acid and upon the degree of decomposition of the silicofluorides formed to fluorides and silicic acid as a function of the pH-value of the neutralized phosphoric acid the metallic impurities are precipitated either as metal phosphates or as metal fluorides. Insoluble fluorides are formed not only at a pH-value lower than 2.3 or 2.5, respectively, whereby the fluorides of iron and aluminum are obtained but also at a pH-value higher than 2.5, whereby the fluorides of magnesium and calcium, for instance, in the form of fluorapatite are precipitated. When neutralizing crude phosphoric acid in order to produce sodium phosphates and using a starting acid which has been substantially freed of fluosilicic acid by conversion into insoluble sodium fluosilicate, the following results are obtained. At a pH-value lower than 2.3 to 2.5 those impurities are precipitated according to the present invention which substantially consist of the phosphates of iron and aluminum. At a pH-value higher than 2.3 to 2.5 those impurities are precipitated which substantially consist of the phosphates of calcium and magnesium. The metal phosphates and especially the phosphates of iron and aluminum are apparently precipitated in a strongly acid medium in a form which is sufficiently stable so that they are not hydrolyzed on further neutralization, thus causing difficulties on filtration.

The acid and super-acid alkali metal or ammonium phosphates of a high degree of purity can be obtained in crystalline form from the purified filtrates of the crude phosphate solutions, neutralized according to the present invention. The slurries, having a low water content, can further be processed in order to recover the phosphoric acid contained therein. For instance, the slurries containing the phosphates of iron and aluminum obtained at a pH-value lower than 2.3 to 2.5 and filtered off at such a pH-value, can be used as starting materials in the manufacture of tri-sodium phosphate by reaction with sodium hydroxide.

The heat energy required to produce the high temperatures employed in the pressure process according to the present invention is substantially supplied by the heat of solution and of neutralization so that additional heat need not be supplied. Crude phosphoric acid or a super-acid alkali metal or ammonium orthophosphate solution is preferably pre-heated to a temperature of about 110° C. in an insulated reaction vessel. Pre-heating is effected either directly by introducing pressure-steam recovered on reducing the pressure and releasing the steam in a preceding pressure-treating operation, or indirectly by heat exchange with the hot final solution of a previously neutralized batch.

By introducing ammonia into crude phosphoric acid of the usual concentration, the neutralization temperature increases by about 50° C. to 100° C. Thus, when producing ammonium phosphate, a neutralization temperature of about 200° C. to about 250° C. can be obtained without supplying additional heat. Likewise, any heat loss can be compensated for by the heat of solution and neutralization.

When neutralization is effected by means of sodium carbonate in order to produce the mono-sodium phosphate, it is advisable first partly to neutralize the crude phosphoric acid to a pH-value of about 2.0 to 2.5 at atmospheric pressure. Further neutralization at increased temperature and under pressure is preferably not carried out with sodium carbonate which is difficult to handle, but with a sodium phosphate solution of alkaline reaction, for instance, with a crude disodium phosphate solution obtained from the mother liquors of a preceding crystallization of mono-sodium phosphate by further neutralization with sodium carbonate, or with a trisodium phosphate solution obtained from the slurries containing the phosphates of iron and aluminum by treating such slurries with sodium carbonate or hydroxide. Such alkaline phosphate solutions must be pre-heated, before neutralization, to the desired temperature between about 100° C. and about 200° C.

In order to purify, at a pH-value of 2.0 to 2.5, a crude super-acid potassium phosphate solution obtained by reacting crude phosphoric acid with potassium hydroxide solution or by evaporating to dryness crude phosphoric acid with the stoichiometric amount of potassium chloride whereby hydrochloric acid is split off and evaporated, it is advisable to heat such a solution to a temperature between about 150° C. to 250° C. and to pass the heated mixture through a pressure vessel. The impurities, i.e. the phosphates of iron, aluminum, titanium, vanadium, and the like metals precipitate within 1 hour to 2 hours at the bottom of the vessel. The precipitate is free of the phosphates of calcium and magnesium. The presence of the precipitate in the pressure vessel causes speedier purification of additional super-acid potassium phosphate solution passing subsequently through the vessel. Said metal phosphate slurry is so heavy that it is not carried along by the super-acid phosphate solution which slowly enters the vessel at its bottom and is withdrawn from its top. The resulting purified solution, which is still somewhat turbid, is clarified by centrifuging in separator centrifuges. Super-acid potassium phosphate is obtained in crystalline form from the centrifuged solution by concentration by evaporation.

It is also within the scope of the present invention to subsequently heat to a temperature between about 110° C. and about 250° C. under pressure crude phosphate solutions which were neutralized at atmospheric pressure to a pH-value exceeding a pH of about 2.0, for instance, to the pH-value whereby mono-alkali metal orthophosphate formation takes place, in order to convert the initially obtained slurry which can be filtered with difficulty only, into a readily filtrable form. Heating at elevated temperature and under pressure is effected either with the addition or without the addition of metal phosphate slurry from preceding operations. When proceeding in this manner, i.e. when effecting neutralization as heretofore under atmospheric pressure and subsequently treating the neutralized solution under pressure at elevated temperature, the same purification effect, i.e. substantially complete precipitation of the metal phosphate slurries in a more coarsely dispersed and more anhydrous form, is achieved.

Especially favorable results are achieved when using a crude phosphoric acid containing about 300 g. of phosphorous pentoxide per liter. The preferred procedure is to heat crude phosphoric acid of such a concentration or the partly neutralized acid phosphate solution under pressure, by means of live steam introduced thereinto. When using a more concentrated phosphoric acid, dilution takes place. After precipitation of the impurities is completed, the vapor pressure is reduced whereby the steam under pressure is released and, as stated above, can be used for preheating the crude phosphoric acid. Due thereto, the phosphate solution which was diluted by the introduction of steam is again concentrated. It is thus possible to start with crude phosphoric acid containing, for instance, 400 g. of phosphorous pentoxide per liter, diluting the neutralized phosphoric acid by the introduction of live steam under pressure to a concentration whereby substantially complete precipitation of the impurities takes place, and causing concentration of the superheated dilute phosphate solution by reducing the pressure and allowing the steam to escape.

Addition of metal phosphate slurry resulting by precipitation of the impurities in the crude phosphoric acid of a preceding operation has proved to be of considerable value as pointed out hereinabove especially when effecting neutralization under pressure to a pH between 2.0 and 2.5. The amounts of slurry added may vary considerably. Amounts of one twentieth of the crude phosphoric acid yield satisfactory results under certain conditions. Larger amounts of slurry, which may exceed many times the amount of slurry to be expected in the operation, may also be added.

For the production of substantially pure alkali metal and ammonium phosphates best results are obtained when using crude phosphoric acid containing 24% to 25% by weight of phosphorous pentoxide corresponding to 300 g. to 310 g. of phosphorous pentoxide per liter.

Concentrated phosphate fertilizers are preferably obtained by using a crude phosphoric acid containing 30% to 32% of phosphorous pentoxide corresponding to 380 g. to 410 g. of phosphorous pentoxide per liter. Such starting material is preferably heated with live steam under pressure to produce the dilution required for substantially complete precipitation of the impurities as has been explained hereinabove.

The purified phosphates made according to the present invention can be used as fast-acting fertilizers, water softening agents, fire-proofing agents, additives to food and medical preparations, ingredients of detergents, and for many other purposes.

The following examples serve to illustrate the present invention without, however, limiting the same thereto.

Example 1

The phosphoric acid used in this and the following examples is made by decomposing Morocco phosphate with sulfuric acid. Fluosilicic acid is removed by adding sodium sulfate during decomposition and by filtering off the insoluble sodium fluosilicate. The resulting crude phosphoric acid has the following composition (all values in g. per liter):

| $P_2O_5$ | $SO_3$ | CaO | $Fe_2O_3$ | $Al_2O_3$ | F | MgO | $Na_2O$ |
|---|---|---|---|---|---|---|---|
| 306 | 7.2 | 4.3 | 2.1 | 1.4 | 1.6 | 3.5 | (¹) |

¹ Present, but not determined.

35 liters of said acid are neutralized with 1.2 kg. of ammonia to a pH-value of 2.0. The solution remains clear. The neutralized acid is then heated to 110° C. in a 50 l. pressure vessel of stainless steel at a vapor pressure of 1.3 kg./sq. cm. Another 1.4 kg. of ammonia are added within a period of two hours, whereby the temperature rises to 120° C. The vapor pressure increases to 1.8 kg./sq. cm. The resulting solution is then cooled to 90° C. within two more hours and is filtered by means of a small plate and frame filter press with a filter area of 3.750 sq. cm. and a capacity of 3 liters. Filtration is effected under a pressure of 4 m. water column and is completed after 12 minutes. The filter residue is washed on the filter, removed therefrom, and dried at 110° C. The wet slurry weighs 2.76 kg. After drying, the weight is 1.01 kg. The water content of the wet slurry, thus, is 63.4%.

35 liters of the same phosphoric acid are neutralized in the usual manner at 105° C. without pressure, while the other conditions are the same as described above. The time for filtration is 2 hours and 25 minutes, the weight of the wet slurry is 3.05 kg., that of the dry slurry is 0.94 kg. The wet slurry, thus, contains 69.5% of water. Filtration requires more than twelve times as much time.

Example 2

35 liters of the crude phosphoric acid used in Example 1 are pre-neutralized with 1.2 kg. of gaseous ammonia. The acid is then heated in a pressure vessel to 240° C. The vapor pressure increases to 34 kg./sq. cm. Neutralization is completed by the addition of another 1.4 kg. of ammonia. The ammonia is supplied from a pressure bottle which is heated to 80° C. and has a vapor pressure of 39 kg./sq. cm. Thereby, the temperature rises to 245–250° C. and the vapor pressure in the pressure vessel increases to 38 kg./sq. cm. The solution is cooled to about 100° C. within 3 hours and is filtered at about 95° C. under the same conditions as described in Example 1. The filter residue is washed, dried at 110° C., and weighed. The time for filtration is 5 minutes. The weight of the wet slurry is 1.35 kg., that of the dry slurry is 1.09 kg. The wet slurry, when filtered and washed, contains only 19.2% of water.

Example 3

35 liters of phosphoric acid of the following composition (in g. per liter):

| $P_2O_5$ | $SO_3$ | MgO | CaO | $Fe_2O_3$ | $Al_2O_3$ |
|---|---|---|---|---|---|
| 385 | 26 | 4 | 2.1 | 3.4 | 1.9 | are mixed with 1 kg. of the wet metal phosphate slurry obtained according to Example 2. The mixture is then partly neutralized by the addition of 1.6 kg. of ammonia and is placed into the heat-insulated pressure vessel used in Examples 1 and 2. The acid is heated with direct steam of a pressure of 7 to 8 atmospheres gauge to 150° C., whereby the vapor pressure in the pressure vessel is 4.5 kg./sq. cm. 1.8 kg. of ammonia are introduced into the acid within 40 minutes. Thereafter its temperature has increased to 170° C. and the vapor pressure to 7.5 kg./sq. cm. When neutralization to the mono-ammonium phosphate is completed, the pressure in the vessel is released, whereby compressed steam escapes, until the temperature has decreased to 150° C. and the vapor pressure to 4.5 kg./sq. cm. After further cooling to 100° C. in the closed vessel, the neutralized reaction mixture is discharged. The metal phosphate slurry settles in the crude monoammonium phosphate solution within a few minutes. The supernatant clear solution is decanted whereby 6 liters of slurry and 33 liters of a slightly turbid solution are obtained.

The decanted slurry is filtered in the plate and frame filter press used in Examples 1 and 2 in less than 2 minutes. The filter residue can be washed with 4 liters of water. It is then free of phosphate solution and consists of particles of a size larger than 10µ. Said particles agglomerate and form crystalline agglomerates of a size of 40–50µ. The wash water contains only 190 g. of phosphorous pentoxide which is less than 0.5% of the total phosphoric acid used. The decanted, slightly turbid solution is cleared by centrifuging in a separator centrifuge and yields thereby a residue of 63 g. of solid substance (1.9 g. per liter). Most of the ammonium phosphate crystallizes from the filtrate in technical grade purity.

*Example 4*

One liter of phosphoric acid of the composition given in Example 1 is oxidized by means of chlorine to destroy the organic impurities and is neutralized to a pH of 2.3 by the addition of sodium carbonate. The mixture is then heated to 200° C. under a vapor pressure of 15 kg./sq. cm. for 3 hours in a beaker placed in a small autoclave. The phosphate solution containing the slurry is cooled to 90° C. and is filtered on a Buchner funnel having a diameter of 5 cm. while applying a vacuum of 500 mm. Hg. Filtration is completed after 55 seconds yielding a clear filtrate. The residue is washed and 13.6 g. of a wet slurry with 24.9% of water corresponding to 10.2 g. of slurry dried at 110° C. are obtained. The precipitate is of crystalline nature and consists to 30% of needles of a length between $12\mu$ and $20\mu$ and to 70% of needles of a length between $8\mu$ and $12\mu$. It is composed of the phosphates of iron and aluminum and contains also titanium, vanadium, arsenic, fluorine, larger amounts of bound sodium, and other impurities of the crude phosphoric acid, but is substantially free of calcium and magnesium. The residual amount of ferriferrous oxide $Fe_2O_3$ in the phosphate solution amounts to 0.02 g./l. and that of aluminum oxide $Al_2O_3$ to 0.22 g./l. Thus, the iron content of the crude phosphoric acid is precipitated substantially quantitatively and that of aluminum to more than 80%.

*Example 5*

One liter of the crude phosphoric acid used in Example 1 is treated with chlorine in order to oxidize organic impurities, neutralized with 115 g. of potassium hydroxide to a pH-value of 2.1, mixed with 5 g. of the slurry from Example 4, and heated to 200° C. (vapor pressure: 15 kg./sq. cm.) by following the procedure described in Example 4. The resulting slurry is filtered off from the solution within 63 seconds. The washed residue weighs 18.1 g. in the wet state and 13.6 g. in the dry state, corresponding to a moisture content of 25.3%. The amount of dry precipitated metal phosphate from one liter of phosphoric acid is 9.8 g. (calculated from the total dry substance minus dry substance added). The structure of the slurry is substantially the same as that of the slurry obtained according to Example 4; likewise the degree of purification. However, at the lower pH-value of 2.1 filtration is effected within about half the time as that required according to Example 4 with a pH-value of 2.3. The filtered solution is concentrated by evaporation to half its volume. On cooling the superacid potassium phosphate of the formula $KH_2PO_4 \cdot H_3PO_4$ crystallizes in technical grade purity.

In place of using potassium hydroxide for neutralization, one liter of the crude phosphoric acid is mixed with 135 g. of potassium chloride and the mixture is concentrated by evaporation to a temperature of 140° C. whereby hydrochloric acid is evaporated. The resulting concentrated mixture is then mixed with one liter of water and 5 g. of metal phosphate slurry obtained in a preceding operation. On heating the mixture to 200° C. under pressure and further working up the slurry and the filtrate as described hereinabove, there is obtained the same result.

*Example 6*

One liter of the phosphoric acid used in Example 1 is oxidized by means of chlorine and is then neutralized by the addition of 100 g. of sodium carbonate to a pH-value of 2.0. The resulting solution remains clear. The mixture is then heated in an autoclave to 160° C. (vapor pressure: 5.5 kg./sq. cm.). 395 g. of trisodium phosphate (27.9% of $Na_2O$, 18.7% of $P_2O_5$) are molten in an autoclave at 170° C. under a vapor pressure of 7.5 kg./sq. cm. and the molten salt is then forced under pressure into the autoclave containing the pre-neutralized phosphoric acid, which is thereby further neutralized. The temperature of 170° C. is maintained thereby. The resulting crude mono-sodium phosphate solution has a pH-value of 3.5 and is filtered from the slurry of precipitated impurities within 85 seconds by following the procedure described in Example 4. The washed slurry has a wet weight of 40 g. and a dry weight of 30.25 g., corresponding to a moisture content of 24.5%. Its analysis is:

| $P_2O_5$, percent | $Al_2O_3$, percent | $Fe_2O_3$, percent | CaO, percent | MgO, percent | F, percent |
|---|---|---|---|---|---|
| 40.5 | 3.9 | 7.3 | 11.1 | 4.4 | 2.5 |

Filtrate and wash water contain the following total amounts of impurities (column 1), corresponding to percent of the initially present amount of impurities (column 2):

| | CaO | MgO | $Al_2O_3$ | $Fe_2O_3$ | F |
|---|---|---|---|---|---|
| (1) Grams | 0.82 | 1.9 | 0.22 | <0.02 | 0.85 |
| (2) Percent | 20 | 60 | 16 | <1 | 50 |

In order to compare the degree of purification achieved by the process according to the present invention with the degree of purification achieved under non-pressure conditions as heretofore employed, the following experiment was carried out:

One liter of the same phosphoric acid is oxidized by means of chlorine and is then neutralized with 235 g. of calcined sodium carbonate at a temperature close to the boiling point of the solution at atmospheric pressure until the acid has a pH value of 3.5. Filtration requires two and a half hours. The washed slurry still contains 55% of water even if subjected to very strong suction filtration. The dry weight of the residue is 27.1 g. The particle size is smaller than $4\mu$. Agglomerates have a size between $8\mu$ and $40\mu$. The dry residue has the following composition:

| $P_2O_5$, percent | $Al_2O_3$, percent | $Fe_2O_3$, percent | CaO, percent | MgO, percent | F, percent |
|---|---|---|---|---|---|
| 46.0 | 4.6 | 8.9 | 3.0 | 0.5 | 4.1 |

Filtrate and wash water contain the following total amounts of impurities (column 1) corresponding to percent of the initially present amount of impurities (column 2):

| | CaO | MgO | $Al_2O_3$ | $Fe_2O_3$ | F |
|---|---|---|---|---|---|
| (1) Grams | 3.6 | 3.30 | 0.35 | 0.1 | 0.7 |
| (2) Percent | 85 | 95 | 25 | 5 | 40 |

It is clearly evident that the purification effect is unsatisfactory when neutralizing crude phosphoric acid at atmospheric pressure according to known procedure and that the degree of purification achieved according to the present invention is far greater.

*Example 7*

One liter of the same phosphoric acid as used in Example 1 is oxidized with chlorine and is then partly neutralized with 109 g. of calcined sodium carbonate. The mixture is heated to 200° C. (vapor pressure; 15 kg./sq. cm.) in a beaker placed in an autoclave and is further neutralized at the same temperature to a pH-value of 4.0 by the addition of 200 cc. of an aqueous sodium hydroxide solution (590 g. of NaOH per liter) forced under a pressure of 16.5 kg./sq. cm. through a capillary tube from a second autoclave into the first autoclave within 20 minutes. The resulting neutralized acid is filtered at 90° C. in less than one minute. The slurry is filtered under suction and washed. The filter residue has a moisture content of 11.6% and a dry weight of 23.7 g. Its composition is:

| $P_2O_5$, percent | $Al_2O_3$, percent | $Fe_2O_3$, percent | CaO, percent | MgO, percent | F, percent |
|---|---|---|---|---|---|
| 43.6 | 5.1 | 9.5 | 13.3 | 6.0 | 3.1 |

The degree of purification at a pH-value of 4.0 corresponds to that achieved at a pH-value of 3.5 according to Example 6.

Example 8

One liter of the same phosphoric acid as used in Example 1 is first partly neutralized with 109 g. of calcined sodium carbonate and then completely neutralized with 260 g. of sodium hydroxide (440 cc. of a solution with 590 g. of NaOH per liter) under a pressure of 16 kg./sq. cm. to a pH-value of 6.0 at a temperature of 150° C. as described in Example 7. The crude solution consists mainly of disodium phosphate. It is filtered at 90° C. within 80 seconds. The washed slurry has a moisture content of 26% and a dry weight of 29.8 g. The purification effect is superior to that achieved in Example 7 only with respect to the removal of magnesium which is insufficiently removed at pH-value of 3.5 and 4.0, as they are used according to Examples 6 and 7.

As is evident from the foregoing specification and examples, the process according to the present invention can be carried out in various modifications.

(I) It has proved to be of special value in producing highly purified phosphate solutions of a pH between about 2.0 and about 2.5 which are either
  (a) First neutralized to said pH-value and then subjected to pressure heating or which are
  (b) Heated under pressure and then neutralized under pressure to a pH between about 2.0 and about 2.5.

(II) It is also useful in the preparation of highly purified phosphate solutions of a pH of about 3.5 whereby either
  (a) The crude phosphoric acid is heated under pressure and then neutralized under pressure to a pH of about 3.5 or whereby
  (b) By a two step process the crude phosphoric acid is first neutralized at atmospheric pressure to a pH between about 2.0 and about 2.5, is then heated under pressure, and further neutralized under pressure to a pH of about 3.5.

(III) For producing highly purified phosphate solutions of a pH higher than 3.5, it is necessary to carry out the neutralization under pressure at a temperature above 110° C. whereby, of course, neutralization may also be effected in two steps, first to a pH of about 2.5 at atmospheric pressure and then, after heating the preneutralized solution under pressure to a temperature exceeding 110° C. to the desired pH-value.

Of course, many changes and variations in the starting crude phosphoric acid solutions and their compositions and impurities, in the manner in which the neutralizing alkali metal and ammonium compounds are added, in the neutralizing conditions, duration, temperature, and pressure, in the methods of working up the neutralized phosphate solutions and of separating the resulting precipitated slurries of impurities therefrom, and the like may be made by those skilled in the art in accordance with the principles set forth herein and in the claims annexed hereto.

We claim:
1. In a process of producing substantially pure alkali metal and ammonium phosphate solutions from crude phosphoric acid solutions obtained by the wet process, the steps which comprise heating the crude phosphoric acid solution under elevated pressure to an elevated temperature exceeding the boiling temperature of the crude phosphoric acid solution at atmospheric pressure and higher than 110° C. by introducing steam under pressure, adding a neutralizing compound selected from the group consisting of an alkali metal hydroxide, ammonia, an alkali metal carbonate, and a trialkali metal phosphate, to adjust the pH-value of the heated solution at said elevated pressure to a pH between about 2.0 and about 3.5 thereby causing precipitation of insoluble phosphates from the neutralized phosphoric acid solution obtained, reducing the pressure on said neutralized solution to atmospheric pressure, thereby releasing pressure-steam, cooling the neutralized solution to a temperature below 100° C., and separating the precipitated phosphates from the solution of substantially pure alkali metal and ammonium phosphates.

2. In a process of producing substantially pure alkali metal and ammonium phosphate solutions from crude phosphoric acid solutions obtained by the wet process, the steps which comprise heating the crude phosphoric acid solution under elevated pressure to an elevated temperature exceeding the boiling temperature of the crude phosphoric acid solution at atmospheric pressure and higher than 110° C. by introducing steam under pressure, adding a neutralizing compound selected from the group consisting of an alkali metal hydroxide, ammonia, an alkali metal carbonate, and a trialkali metal phosphate, to adjust the pH-value of the heated solution at said elevated pressure to a pH between about 2.0 and about 3.5, thereby causing precipitation of insoluble phosphates from the neutralized phosphoric acid solution obtained, reducing the pressure on said neutralized solution to atmospheric pressure on said neutralized solution to atmospheric pressure, thereby releasing pressure-steam, cooling the neutralized solution to a temperature below 100° C., separating the precipitated phosphate slurry from the solution of substantially pure alkali metal and ammonium phosphates, adding the precipitated phosphate slurry to an additional quantity of said crude phosphoric acid solution to adjust the pH-value of the resulting mixture to a pH between about 2.0 and about 3.5, heating the neutralized mixture under said elevated pressure to a temperature exceeding 110° C., and separating the slurry from the remainder of said mixture.

3. In a process of producing substantially pure alkali metal and ammonium phosphate solutions from crude phosphoric acid solutions obtained by the wet process, the steps which comprise heating the crude phosphoric acid solution under elevated pressure to an elevated temperature exceeding the boiling temperature of the crude phosphoric acid solution at atmospheric pressure and higher than 110° C. by introducing steam under pressure, adding a neutralizing compound selected from the group consisting of an alkali metal hydroxide ammonia, an alkali metal carbonate, and a trialkali metal phosphate, to adjust the pH-value of the heated solution at said elevated pressure to a pH between about 2.0 and 3.5, thereby causing precipitation of insoluble phosphates from the neutralized phosphoric acid solution obtained, reducing the pressure on said neutralized solution to atmospheric pressure, thereby releasing pressure-steam, cooling the neutralized solution to a temperature below 100° C., separating the precipitated phosphate slurry from the solution of substantially pure alkali metal and ammonium phosphates, adding the precipitated slurry to an additional quantity of said crude phosphoric acid solution to adjust the pH-value of the resulting mixture to a pH between about 2.0 and about 2.5, heating the neutralized mixture under said elevated pressure to a temperature exceeding 110° C., cooling the resulting neutralized mixture to a temperature below 100° C., and separating the slurry from the remainder of the mixture.

4. In a process of producing substantially pure alkali metal and ammonium phosphate solutions from crude phosphoric acid solutions obtained by the wet process, the steps which comprise heating a phosphoric acid starting solution selected from the group consisting of the crude phosphoric acid solution obtained by the wet process and a crude phosphoric acid solution preneutralized to a pH of about 2.0 to an elevated temperature exceeding the boiling temperature of said crude phosphoric acid solution at atmospheric pressure and higher than 110° C., while maintaining said solution under an elevated pressure substantially higher than atmospheric pressure, adding to said heated crude phosphoric acid solution at said elevated temperature and pressure a neutralizing compound selected from the group consisting of an alkali metal hydroxide, ammonia, an alkali metal carbonate, and a trialkali metal phosphate, to adjust the pH-value of the heated crude phosphoric acid solution at said elevated temperature and pressure to a pH between about 2.0 and about 4.0, cooling the resulting neutralized solution to a temperature below 100° C., whereby a coarsely dispersed slurry containing the impurities is precipitated from the remainder of the solution, and separating said slurry from said remaining solution of substantially pure alkali metal and ammonium phosphates.

5. The process according to claim 4, wherein the precipitated slurry from a preceding operation is added to the crude phosphoric acid starting solution.

6. The process according to claim 4, wherein the elevated temperature during pressure neutralization is between about 110° C. and about 250° C.

7. The process according to claim 4, wherein the neutralizing compound to adjust the pH-value of the crude phosphoric acid solution to a pH between about 2.0 and about 2.5 is sodium carbonate, while the neutralizing compound to subsequently adjust the partly neutralized phosphoric acid solution to a pH of about 3.5 is trisodium phosphate.

References Cited by the Examiner
UNITED STATES PATENTS

| | | | |
|---|---|---|---|
| 2,792,286 | 5/57 | Wordie et al. | 23—107 |
| 2,857,245 | 10/58 | Fallin | 71—37 |
| 2,891,856 | 6/59 | Getsinger | 71—41 |
| 2,917,367 | 12/59 | Hodges et al. | 23—165 |
| 2,933,372 | 4/60 | Manning | 23—165 |
| 2,977,201 | 3/61 | Stephens | 71—41 |

MAURICE A. BRINDISI, *Primary Examiner.*